No. 652,670. Patented June 26, 1900.
G. DURYEE.
APPARATUS FOR CREMATING GARBAGE.
(Application filed Apr. 27, 1899.)
(No Model.)
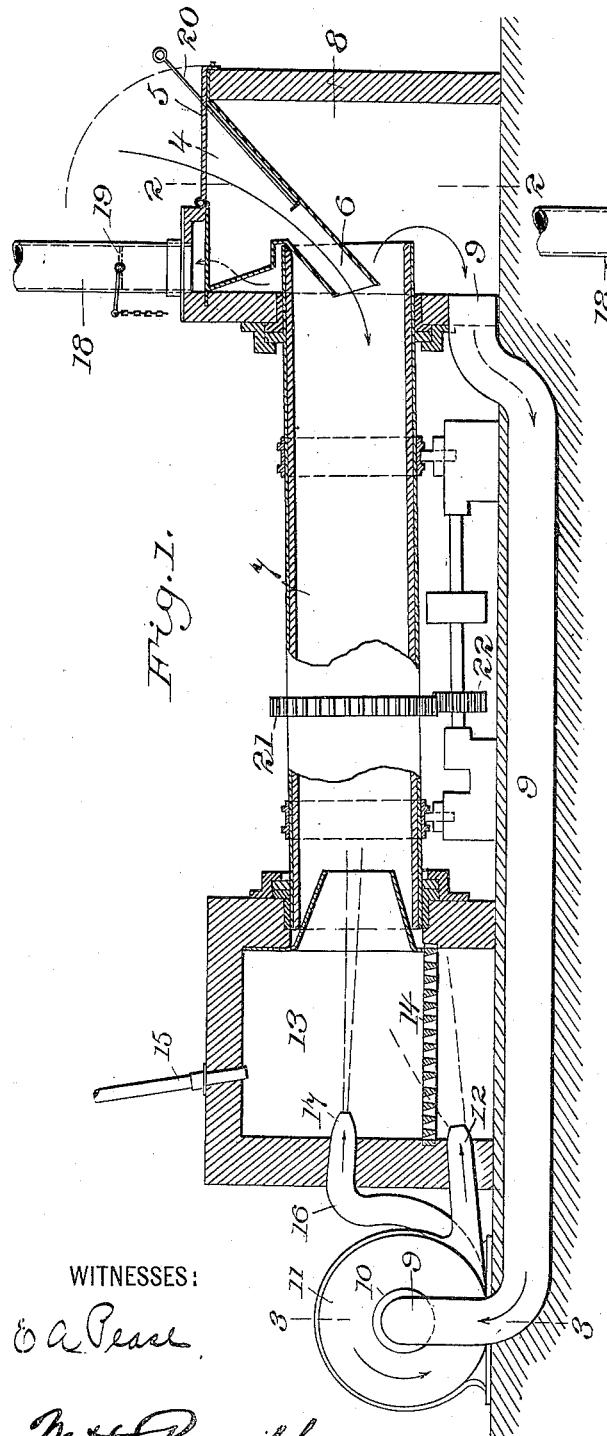
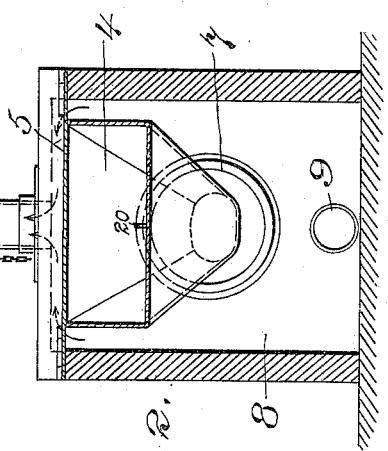
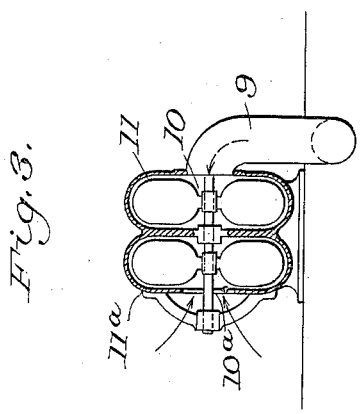
WITNESSES:
INVENTOR
George Duryee
BY
ATTORNEYS

UNITED STATES PATENT OFFICE.

GEORGE DURYEE, OF MIDDLE HOPE, NEW YORK.

APPARATUS FOR CREMATING GARBAGE.

SPECIFICATION forming part of Letters Patent No. 652,670, dated June 26, 1900.

Application filed April 27, 1899. Serial No. 714,708. (No model.)

*To all whom it may concern:*

Be it known that I, GEORGE DURYEE, a citizen of the United States, and a resident of Middle Hope, in the county of Orange and State of New York, have invented a new and Improved Apparatus for Cremating Garbage and other Refuse Matter, of which the following is a specification.

My mode of operation consists in burning garbage and other refuse matter in towns and cities by feeding the same into a roasting-chamber, from which it is delivered into the upper end of an inclined revolving burning-cylinder. The material after preliminary roasting and the removal of noxious gases evolved in the destruction of organic matter is gradually conveyed to the lower end of said inclined revolving cylinder and meets in its passage a blowpipe-flame entering the lower end of the revolving cylinder from an adjacent furnace, which is preferably supplied with solid and liquid fuel. The roasting-chamber at the upper end of the revolving cylinder is exhausted by a suitable flue and fan, by which the noxious gases are conveyed to the fuel-furnace and delivered beneath the flame therein in order to be consumed. A fan is also provided to take fresh air from the outside and force the same into the upper part of the fuel-furnace in order to produce the blowpipe-flame, which is delivered therefrom into the lower end of the revolving burning-cylinder. A smoke-stack controlled by a damper provides a draft in starting the initial fire in the fuel-furnace. As soon as the furnace is hot enough to effect complete combustion the damper is nearly closed, leaving just sufficient vent for escape of the final gaseous products of combustion.
In order that my invention may be fully understood, I will proceed to describe the same with reference to the accompanying drawings, in which—

Figure 1 is a vertical longitudinal section of an apparatus illustrating the invention. Fig. 2 is a section on the line 2 2, Fig. 1, and Fig. 3 is a section on the line 3 3, Fig. 1, showing a suitable construction of a double exhaust and blast fan.

4 represents a dump receptacle or hopper and storage-tank for garbage and other refuse, having at top a tight door 5, which is opened for the dumping of garbage, &c., into the receptacle and closed during the operation of cremation, so that the receptacle may serve as a preliminary roasting-chamber. In the bottom of the receptacle 4 is a delivery-chute 6, which discharges into the upper end of an inclined revolving cylindrical furnace 7 for cremation. The feed-chute 6 and the upper end of the inclined rotary furnace 7 are inclosed in a combustion-chamber 8, from the lower part of which an exhaust-flue 9 conducts the gases evolved from the garbage and other matter prior to complete combustion, as hereinafter described. The exhaust-flue 9 communicates with the eye 10 of an exhaust-fan 11, from the case of which a blast-flue 12 conveys the gases to the lower part of a fuel-furnace 13, which is preferably constructed with a suitable grate 14 for solid fuel and in its upper part with one or more pipes 15 for the introduction of a jet of petroleum or other liquid fuel or powdered coal, or both. The inclined rotary furnace 7 communicates at its lower end with the fuel-furnace 13, as shown, so as to receive the entire gaseous products of combustion therefrom.

$11^a$ is a blast-fan adapted to take fresh air through its central opening or eye $10^a$ and to deliver the same tangentially to a blast-pipe 16, provided at its extremity with a nozzle 17, which projects into the fuel-furnace 13 approximately in line with the center of the lower end of the rotary furnace 7, so as to force a blowpipe-flame into and through the said rotary furnace from the combustion of fuel within the furnace 13. For simplicity in construction and operation I prefer to mount the exhaust-fan 11 and blast-fan $11^a$ on one shaft, as here represented. A smoke-stack 18, provided with a damper 19, communicates with the top of the combustion-chamber 8, surrounding the upper end of the revolving cylinder 7, so as to provide draft in first firing and afterward to permit a vent for the discharge of the final products of combustion after the organic matter and noxious gases have been entirely consumed and destroyed.

20 represents a poker or scraper to aid the dumping of roasted garbage from the hopper 4 to the revolving cylinder 7 as may be necessary. Suitable gearing for rotating the cylinder 7 is shown at 21 22.

In the operation of the apparatus above described the garbage and other refuse matter dumped into the hopper 4 encounter roasting heat from the surrounding combustion-chamber 8, and any noxious gases from this roasting heat are exhausted by the flue 9 and fan 11 and discharged through the blast-flue 12 beneath the grate and flame in the fuel-furnace 13, where they are completely consumed. The garbage and other refuse matter after the first roasting above described, passing into the rotary cylinder 7, are conveyed by the rotation thereof toward the lower end of the same, encountering the blowpipe-flame from the fuel-furnace 13, which causes the complete destruction of such garbage, refuse, and all organic matter.

In first firing up the damper 19 in the stack 18 is opened to cause the necessary draft through the fuel-furnace 13. After the apparatus has acquired its full heat, so as to effect the roasting of the garbage in the chamber 4, the damper 19 is nearly closed, leaving only sufficient vent for the discharge of the final products of combustion from the rotary furnace 7 in volume corresponding with the intake of fresh air through the eye $10^a$ of the fan, but without any strong upward draft through the combustion-chamber 8, owing to the large capacity of the said chamber. The active and forced circulation is through the exhaust-flue 9, fan 11, fuel-furnace 13, and rotary furnace-cylinder 7 continuously, and this forced draft effectually carries with it all noxious gases evolved from the garbage and refuse matter in the preliminary roasting process, delivering it beneath the flame in the fuel-furnace for combustion, as explained. Any solid incombustible matter or ash resulting from incineration of the garbage, &c., in the revolving furnace 7 falls out at the lower end of said revolving furnace and is discharged with ashes and cinders from the fuel in the fuel-furnace 13.

Having thus described my invention, the following is what I claim as new therein and desire to secure by Letters Patent:

1. In a crematory for garbage and the like, the combination of the closed hopper 4; discharge-chute 6 therefrom; combustion-chamber 8 inclosing the latter; revolving cylindrical furnace 7, into which the chute 6 delivers; fuel-furnace 13; exhaust-flue 9 conveying gases from the combustion-chamber 8 to the fuel-furnace 13; a blast-fan, as $11^a$ and a blowpipe 16, 17 opposite the discharge end of the rotary furnace 7, delivering a blowpipe-flame into and through said rotary furnace and inducing flow of gas through the fuel-furnace 13; substantially as set forth.

2. The combination of the revolving inclined cylindrical furnace 7, feed-hopper 4, preliminary combustion-chamber 8, exhaust-flue 9, exhaust-fan 11 communicating therewith, fuel-furnace 13, pipe 12 discharging gases from the fan 11 beneath the flame in said fuel-furnace and the blast-fan $11^a$ and its delivery-pipe 16 and nozzle 17 communicating with the interior of the fuel-furnace 13 opposite the discharge end of the rotary furnace 7 and delivering a blowpipe-flame into and through said rotary furnace, as explained.

3. In a crematory for garbage and the like; the combination of the feed-hopper 4; inclined revolving cylindrical furnace 7, into the upper end of which said hopper discharges; fuel-furnace 13 communicating with lower end of said revolving furnace; exhaust-pipe 9 conducting gases from the space around the delivery-mouth of the hopper 4; exhaust-fan 11 delivering said gases from exhaust-pipe 9 to the fuel-furnace 13; liquid-fuel pipe 15, air-blast fan $11^a$; and blowpipe 16, 17; substantially as and for the purpose set forth.

4. In a crematory for garbage and the like the combination of the receiving and roasting hopper 4; combustion-chamber 8, inclosing the delivery-mouth of said hopper; rotary burning-cylinder 7 into the upper end of which the hopper 4 discharges; fuel-furnace 13 communicating with the lower end of the burning-cylinder 7; exhaust-flue 9 connected with the combustion-chamber 8; and the fans 11, $11^a$ mounted in a divided fan-case, the one delivering gases from the exhaust-flue 9 into the fuel-furnace 13, and the other delivering air through a blowpipe 16, 17 into the fuel-furnace opposite the discharge end of the burning-cylinder, so as to drive a blowpipe-flame into the same, as explained.

GEORGE DURYEE.

Witnesses:
  H. DURYEE,
  M. B. RAWSON.